A. BROWN.
WATERING TOOL.
APPLICATION FILED JUNE 3, 1915.
1,175,593. Patented Mar. 14, 1916.
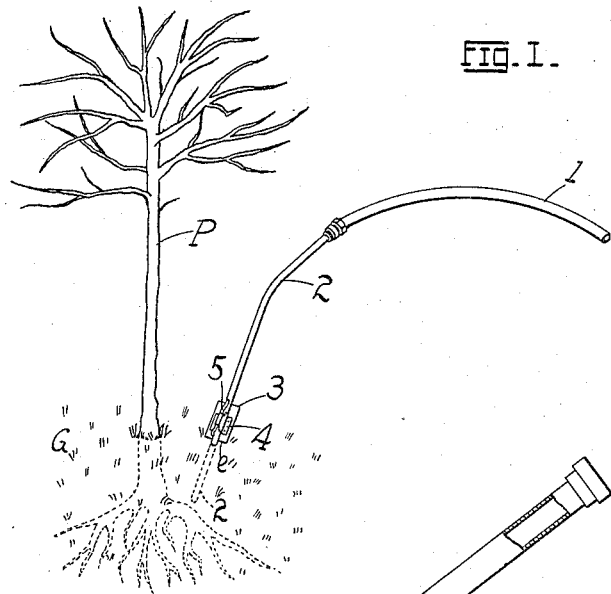
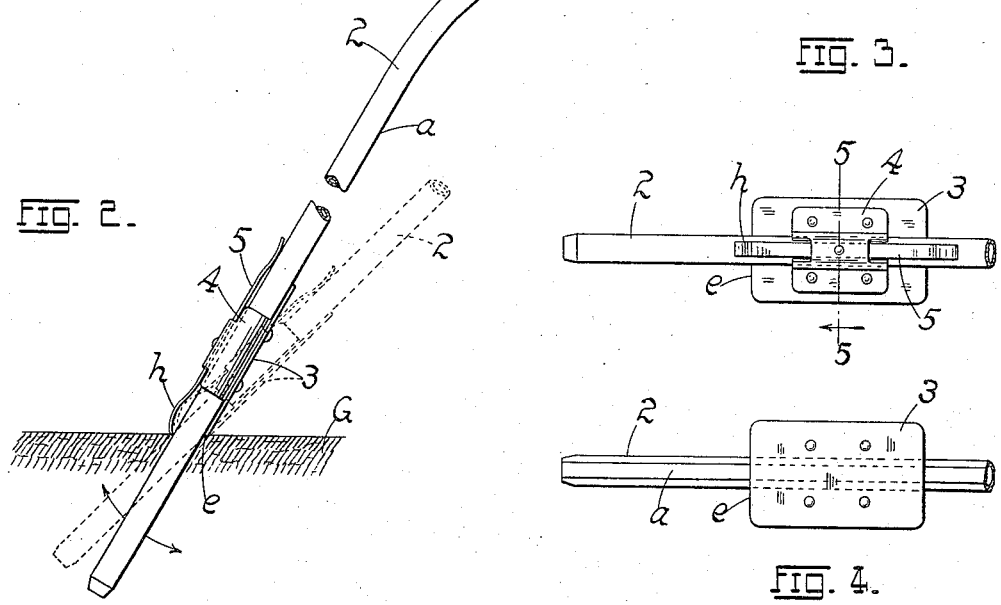
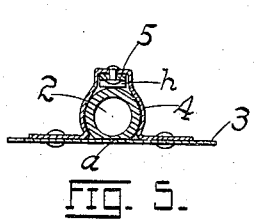
INVENTOR.
Alfred Brown.
BY
ATTORNEY.
WITNESSES:

UNITED STATES PATENT OFFICE.

ALFRED BROWN, OF ST. LOUIS, MISSOURI.

WATERING-TOOL.

1,175,593.  Specification of Letters Patent.  Patented Mar. 14, 1916.

Application filed June 3, 1915. Serial No. 31,906.

*To all whom it may concern:*

Be it known that I, ALFRED BROWN, a citizen of the United States, residing at St. Louis, State of Missouri, have invented certain new and useful Improvements in Watering Tools, of which the following is a full, clear, and exact description, reference being had to the accompanying drawings, forming a part hereof.

My invention has relation to improvements in watering tools; and it consists in the novel features of construction more fully set forth in the specification and pointed out in the claims.

The present invention is directed to devices for watering the roots of trees, shrubs, bushes and the like where the water reaching the root of the plant in the first instance is a prime necessity for the proper nourishment, and for saving the life of the plant. The desirability of conducting the water in the first instance to the roots is a matter well understood by the gardener, and with some species of tree, especially young trees, the roots must be watered to save the tree from dying.

The object of my invention is to provide a nozzle which will direct the water to the roots at any desired depth; one which is simple, readily manipulated, and one possessing further advantages better apparent from a detailed description of the invention in connection with the accompanying drawings in which—

Figure 1 represents a perspective view of the tool applied to the roots of a sapling; Fig. 2 is a side elevation of the tool broken at an intermediate point; Fig. 3 is a top plan of the lower portion of the tool; Fig. 4 is a bottom plan of the lower portion of the tool; and Fig. 5 is a cross-section on the line 5—5 of Fig. 3.

Referring to the drawings, 1 represents a conventional garden hose to the outer end of which is coupled a pipe or nozzle 2, said nozzle being bowed and approximately three feet in length, the bow or bend being nearer the base or upper end of the nozzle. The under face of the nozzle is flattened from a point beginning at the free end of the nozzle and terminating substantially at the outer end of the concaved side of the bowed portion, said flat face *a* serving as a bearing for the sliding plate 3 disposed so as to project a suitable distance on each side of the nozzle as shown. The plate 3 is mounted slidably on the nozzle, being connected thereto by a strap 4 loosely embarcing the nozzle, the sides of the strap being riveted or otherwise secured to the shield. Carried by the strap 4 is a longitudinal strip 5 whose forward or outer terminal *h* is flexed or bowed to impart resiliency or spring to the strip, the edge of the flexed terminal bearing against the wall of the nozzle or pipe when the strap 4 is passed thereover. The plate 3 operates as a gage to indicate the depth to which the pipe or nozzle shall be inserted into the earth when the roots of the plant are being watered. The plate 3 being flat and engaging as it does the flat face *a* of the pipe, it follows that rotary displacement of the plate about the pipe is prevented, thus insuring the engagement of the lower transverse edge *e* of the plate with the ground when the pipe or nozzle is inserted into the ground to the point where said edge engages the surface of the ground.

In the practical application of the watering tool, the plate 3 is slipped along the pipe or nozzle to a point where the desired length of pipe is left below the plate for insertion into the ground G at the proper dissertion from the tree or plant P whose roots are to be watered. The water is then turned on at the hydrant or other source of supply, and the free end of the pipe is forced into the ground to a depth indicated by the position of the lower edge *e* of the plate or gage 3, the water running from the nozzle softening the earth so that the progressive insertion of the pipe to the proper depth is not difficult. The pipe being fully inserted to the required depth, the same may be worked around or up and down to a greater or less extent beneath the surface of the ground (Fig. 2) the lower edge *e* of the plate 3 serving as a fulcrum during these manipulations, and the body of the plate serving as a shield to prevent the portion of the pipe immediately above and adjacent to, the surface of the ground from becoming embedded in the ground or from ruining the lawn where the surface operated over is sodded. Thus the plate 3 serves not only as a gage to determine in the first instance the depth to which the pipe shall be inserted into the earth, but serves as a shield to protect the surface in the neighborhood of the pipe during the watering operation and while the pipe is being worked around beneath the surface of the ground; the edge $c$ of the plate maintaining a fixed position as a fulcrum during the manipulations of the pipe, by virtue of the non-rotatable connection of the plate with the pipe.

The bow in the pipe or nozzle near the base thereof is an advantage in the handling of the apparatus, since by turning the concaved side of the bow toward the operator, we are assured that the edge $e$ of the plate 3 will be on the proper side to engage the surface of the ground into which the portion of the pipe below the said edge is driven.

I may of course change the details of construction of the device without departing either from the nature or spirit of my invention. At the conclusion of the watering operation, the plate 3 may be shifted to bring its edge $e$ even or flush with the free end of the pipe, and the plate used as a scraper or hoe to close up the openings left in the earth by the withdrawal of the pipe therefrom.

Having described my invention what I claim is:

1. A watering tool comprising a pipe coupled to a source of water supply and bowed at its upper portion, the wall of the pipe being flattened from a point between the outer end of the concaved side of the bowed portion to the free end of the pipe, a sliding plate engaging said flattened face, a strap loosely securing the plate to the pipe, the outer edge of the plate being disposed at right angles to the axis of the pipe, and a resilient member carried by the strap and engaging the walls of the pipe on the side opposite from the plate.

2. A watering tool comprising a pipe coupled to a source of water supply and bowed at its upper portion, the wall of the pipe having a flattened face, extending from the free end of the pipe to a point near the outer end of the concaved side of the bow, a sliding plate engaging the flat face and terminating at its outer end in an edge transverse to the axis of the pipe, a strap loosely embracing the cylindrical wall of the pipe and securing the plate non-rotatably to the pipe, a longitudinally disposed strip secured to the strap on the side of the pipe opposite the plate, the said strip terminating in an outer flexed or bowed end engaging with its edge the pipe wall, whereby a resilient connection between the strap and pipe is effected, the parts operating substantially as, and for the purpose set forth.

In testimony whereof I affix my signature, in presence of two witnesses.

ALFRED BROWN.

Witnesses:
EMIL STAREK,
ELSE M. SIEGEL.

Copies of this patent may be obtained for five cents each, by addressing the "Commissioner of Patents, Washington, D. C."